United States Patent [19]

Barlett

[11] Patent Number: 5,505,620

[45] Date of Patent: Apr. 9, 1996

[54] PLANNING AND TOY ASSEMBLIES, AND THE LIKE, EMPLOYING MOVABLE ELEMENTS OF PERMANENT MAGNET MATERIAL

[76] Inventor: Ernest R. Barlett, 2273 Mount Forest Drive, Burlington ON, Canada, L7P 1H8

[21] Appl. No.: 368,900

[22] Filed: Jan. 5, 1995

[51] Int. Cl.⁶ ............................................. G09B 25/00
[52] U.S. Cl. ............................................. 434/73; 434/80
[58] Field of Search ................. 434/73, 80; 273/157 R, 273/239

[56] References Cited

U.S. PATENT DOCUMENTS

| | | | |
|---|---|---|---|
| 2,878,586 | 3/1959 | Ohlsson | 434/80 |
| 2,941,314 | 6/1960 | Schwieger | 434/73 |
| 3,659,353 | 5/1972 | D'Agrosa | |
| 3,994,079 | 11/1979 | Mirman | 434/73 |
| 4,245,401 | 1/1981 | Riflhlz | 434/80 |
| 4,398,893 | 8/1983 | Johns | 273/239 |
| 4,652,239 | 3/1987 | Brimberg | 434/80 |
| 4,806,102 | 2/1989 | Pedersen | 434/73 |
| 5,112,052 | 5/1992 | Yamhura | 273/239 |
| 5,141,437 | 8/1992 | Fowlkes, Jr. | 434/80 |
| 5,421,581 | 6/1995 | Smith | 273/239 |

*Primary Examiner*—Paul J. Hirsch
*Attorney, Agent, or Firm*—McConnell and Fox

[57] ABSTRACT

Planning and toy assemblies of the invention comprise element receiving and storage members and a plurality of elements adherable by permanent magnet attraction to their receiving surfaces, the assembly also usually comprising a folder in which they are stored and carried. Each member comprises a thin sheet of magnetizable metal with a surface sheet mounted thereover. The receiving member surface carries a planning grid or picture, while the storage members have depictions on their exposed surfaces of the elements that are placed thereon. Each element is a piece punched from permanently magnetized sheet material of sufficient magnetic field strength to adhere to the metal sheets, even through a thin non-magnetic layer, and also carries a depiction of what it represents. Each element depiction has a respective visual orientation, while the sheet material has a respective magnetic orientation, and preferably while one plurality of the elements have their visual and magnetic orientations in a first angular relation, another plurality have their orientations in a different angular relation, so that elements of the two pluralities can overly one another without interaction of the magnetic fields that might otherwise cause unwanted relative movement between the overlying elements. A further plurality may have their orientations in an angular relation different from that of the other two pluralities for the same purpose. The two or three pluralities of elements may be formed by stamping from a single sheet of the material, and thereafter are mounted on the storage members with the same visual orientation.

27 Claims, 6 Drawing Sheets

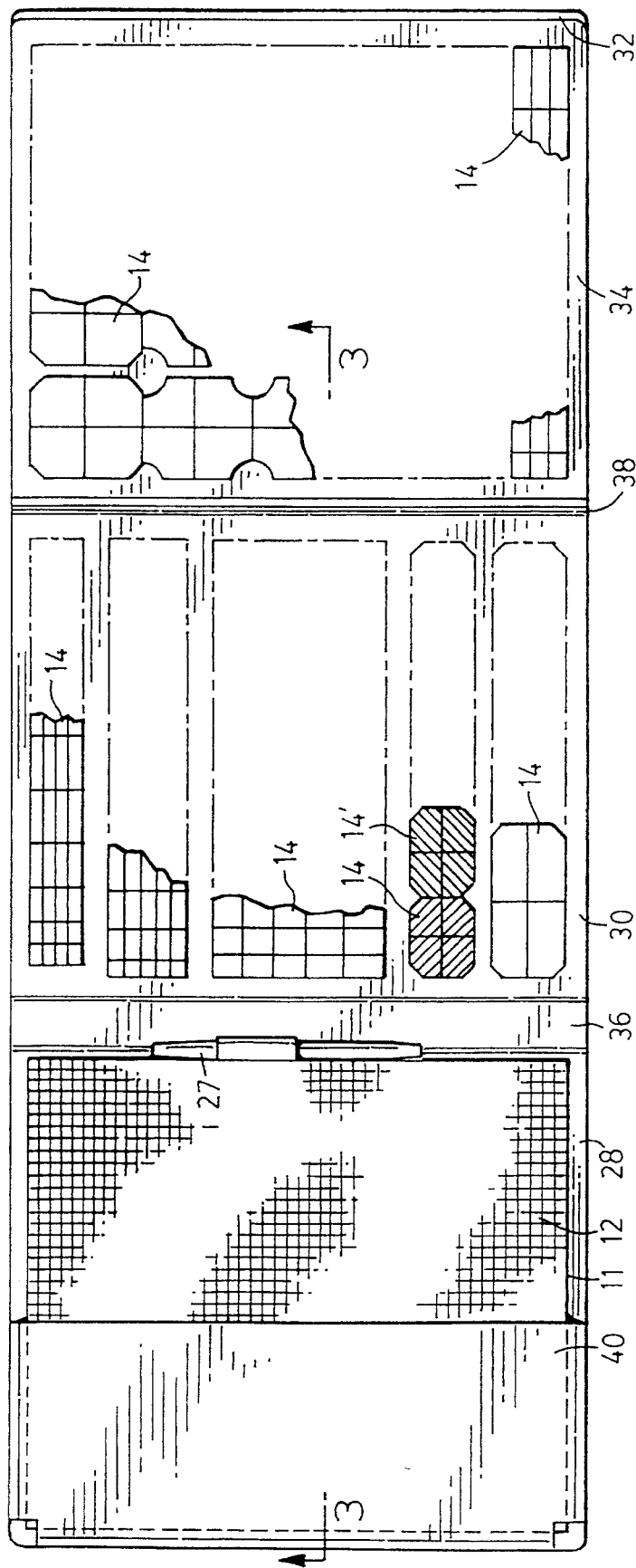
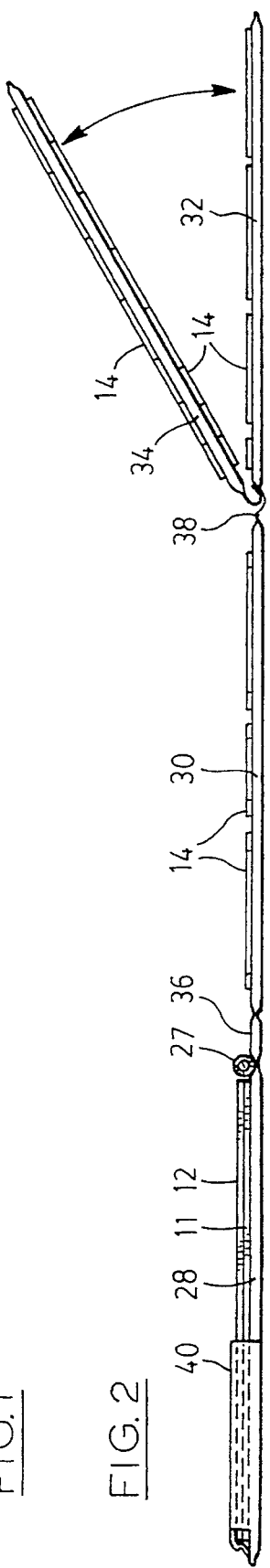
FIG.1
FIG.2

PROJECT INFORMATION

Date: / /
Client Name:
Tel. #: ( )
Fax #: ( )
Dealer Name:
Tel. #: ( )
Fax #: ( )
Contact Name:

Project Reg. #:
Furniture Series:
Area:
User Name:
Estimated Delivery: / /
Net Price: $

COLOR SCHEME

Surfaces: _____ Fabric A: _____
Sides: _____ Fabric B: _____
Fronts: _____ Other: _____

NOTES

SCALE: 1/4" = 1'

Drawing #

0 1 2 3 4 5 6 7 8 9 10 11 12 13 14 15 16 17 18 19 20

PLANNING AND TOY ASSEMBLIES, AND THE LIKE, EMPLOYING MOVABLE ELEMENTS OF PERMANENT MAGNET MATERIAL

FIELD OF THE INVENTION

This invention is concerned with improvements in or relating to planning and toy assemblies, and the like, employing movable elements made from sheet permanent magnet material. It is also concerned with new constructions for such assemblies and new assemblies of sheets of elements made from sheet permanent magnet material.

REVIEW OF THE PRIOR ART

Sheet permanent magnet material is now a well-established commercial product, and usually is made by mixing powdered high-permeability ferrite material into a uniform mixture with a suitable settable plastic vehicle. The mixture is converted into strip or sheet form, and the plastic vehicle is set to provide a permanent stable product that usually is somewhat flexible, and that can readily be handled and made into elements of any desired shape by cutting and/or stamping. The ferrite material is permanently magnetized so that the resulting elements can act individually as permanent magnets, the magnetic field being of sufficient strength that they will adhere to a magnetizable metal surface, such as the surface of an iron or steel sheet, even through a sheet of paper or thin cardboard. A popular application of such materials is thin, flat magnets having on what is called for convenience in description their outer surface a decorative pattern and/or information, such as advertising. These magnets are adherable to the sheet steel door of a refrigerator, where they can also be used to hold sheets of paper, etc. thereon. The surface of the sheet that is intended to contact, or to be closer to, the supporting metal surface will be referred to herein as an inner surface. Ferrites and the resultant sheet materials are inherently somewhat dark in colour, and therefore it is usual to cover the sheet outer surface with a thin layer of a lighter coloured material, usually a plastics material, on which the decorative patterns etc. can be printed.

There has been to my knowledge one prior commercial product comprising a planning assembly for planning the layout of furniture in offices. The assembly included a base member comprising a sheet of permanent magnet material covered with a sheet of permeable vinyl material having a square grid pattern on its exposed surface, and on which a plan of the office can be drawn to a scale dictated by the grid cell size. The assembly also included a number of planning elements of size to the same scale as the grid, each element being of shape as seen in plan from above corresponding to that of a respective piece of office furniture. These planning elements were made from thin sheet ferrous metal coated with a plastics material (a polyethylene) to cover and protect the sharp metal edges, and to provide a surface on which a representation of the furniture item was printed. The elements adhere securely to the permanently magnetized base member and yet can be moved relatively easily thereon until a satisfactory layout has been obtained.

The manufacture of such sheet metal based elements is relatively expensive, and a possible reason for the adoption of this particular assembly structure is given below. The resultant assembly is therefore correspondingly expensive, especially in view of the large number of small, separate elements that must be provided in a satisfactorily complete planning kit. Its cost has been such that, as far as I am aware, its use in practice appears to have been confined to office furniture salespersons who are able to make repeated use of it. It is of course preferred that a kit should be as inexpensive to manufacture as possible, and preferably sufficiently inexpensive that one can be given to each prospective client for them to use at their convenience. The entire assembly, and particularly the planning elements, can carry the name of the furniture line and thus serve as a powerful, specific advertising and promotional tool.

DEFINITION OF THE INVENTION

It is a principal object of the invention to provide new planning and toy assemblies, and the like, employing elements capable of adhesion magnetically to a base member, such elements being fabricated from sheet permanent magnet material.

It is another object to provide such assemblies of new construction.

It is a further object to provide new products comprising sheets of elements stamped or otherwise cut from sheets of permanent magnet material.

It is a still further object to provide such new planning and toy assemblies that are relatively economical and inexpensive to manufacture.

It is a still further object to provide such new planning and toy assemblies, and such new sheets of elements, in which elements can be stacked one upon the other without relative transverse displacement by the magnetic forces between them.

In accordance with the present invention there is provided a planning and toy assembly, or the like, comprising:

an element receiving member providing an element receiving surface;

an element storage member for the storage of a plurality of elements also providing an element receiving surface; and a plurality of elements adherable by permanent magnetic attraction to the element receiving surfaces;

wherein the element receiving member comprises;

a thin sheet of magnetizable metal;

and a surface sheet mounted over the metal sheet and having on the exposed surface thereof a representation facilitating the location of elements placed thereon;

wherein the element storage member comprises;

a thin sheet of magnetizable metal;

and a respective surface sheet mounted over the metal sheet and having on the exposed surface thereof representations of elements to be stored thereon; and wherein each element comprises a portion of a permanently magnetized sheet material operable as a permanent magnet of sufficient strength to adhere to the exposed surfaces of the receiving and storage member surface sheets.

Preferably in such an assembly, wherein each element exhibits a visual representation having a respective visual orientation and the permanent magnetic sheet material thereof has a respective magnetic orientation;

one plurality of the elements have their visual and magnetic orientations in a first angular relation to one another; and another plurality of the elements have their orientations in another angular relation to one another whereby, when elements of the two pluralities are adhered with the same visual orientation to an element receiving member, the magnetic orientations of the two pluralities are inclined to one another at an angle permitting an element of one plurality to be adhered to the element receiving member while overlying an element of the other plurality adhered to the element receiving member, without interaction between their respective permanent magnet fields that would otherwise cause relative movement between the overlying elements.

Also preferably a further plurality of the elements have their visual and magnetic orientations in an angular relation to one another different from that of the said one and another pluralities whereby, when elements of all three pluralities are adhered with the same visual orientation to the element receiving member, the magnetic orientations of the pluralities are inclined to one another at angles permitting an element of one plurality to be adhered to the element receiving member while overlying an element of either of the other two pluralities adhered to the element receiving member, without interaction between their respective permanent magnet fields that would otherwise cause relative movement between the overlying elements.

Also in accordance with the invention there is provided an assembly of elements of permanent magnet sheet material, wherein each element exhibits a visual representation having a respective visual orientation and the permanent magnetic sheet material thereof has a respective magnetic orientation;

wherein one plurality of the elements have their visual and magnetic orientations in a first angular relation to one another; and wherein another plurality of the elements have their visual and magnetic orientations in another angular relation to one another whereby, when elements of the two pluralities are adhered with the same visual orientation to an element receiving member comprising a sheet of magnetizable metal, the magnetic orientations of the two pluralities are inclined to one another at an angle permitting an element of one plurality to be adhered to the element receiving member while overlying an element of the other plurality adhered to the element receiving member, without interaction between their respective permanent magnetisms that would otherwise cause relative movement between the overlying elements.

Preferably in such an assembly of elements, a further plurality have their visual and magnetic orientations in an angular relation to one another different from that of the said one and another pluralities whereby, when elements of all three pluralities are adhered with the same visual orientation to the element receiving member, the magnetic orientations of the pluralities are inclined to one another at angles permitting an element of one plurality to be adhered to the element receiving member while overlying an element of either of the other two pluralities adhered to the element receiving member.

The two or three pluralities of elements with these different angular relations may be formed by stamping from a single sheet of permanent magnet sheet material.

DESCRIPTION OF THE DRAWINGS

Planning and toy assemblies, and assemblies of elements for use in such assemblies, that are preferred embodiments of the invention will now be described, by way of example, with reference to the accompanying diagrammatic drawings, wherein:

FIG. 1 is a plan view from above of an assembly that is a first embodiment comprising a folder adapted to store a removable element receiving member, and comprising four element storage members hingedly connected to one another;

FIG. 2 is an end elevation of the assembly of FIG. 1;

In the plan view figures of the drawings the element receiving and support members, and the elements themselves, are shown to their usual relative scale, but in all of the cross-sectional figures the thicknesses of the different sheets and layers are exaggerated for clarity of illustration.

DESCRIPTION OF THE PREFERRED EMBODIMENTS

Referring now to FIGS. 1 through 5, the planning assembly illustrated thereby is intended for the planning of the layout of office furniture, but the fundamental structure involved is applicable to other planning assemblies, such as for kitchens, bathrooms, living accommodations, architectural layouts and landscaping, or to like structures such as annunciators requiring selectable movable information elements, or to toys employing selectable movable decorative and information elements.

Figure 3:
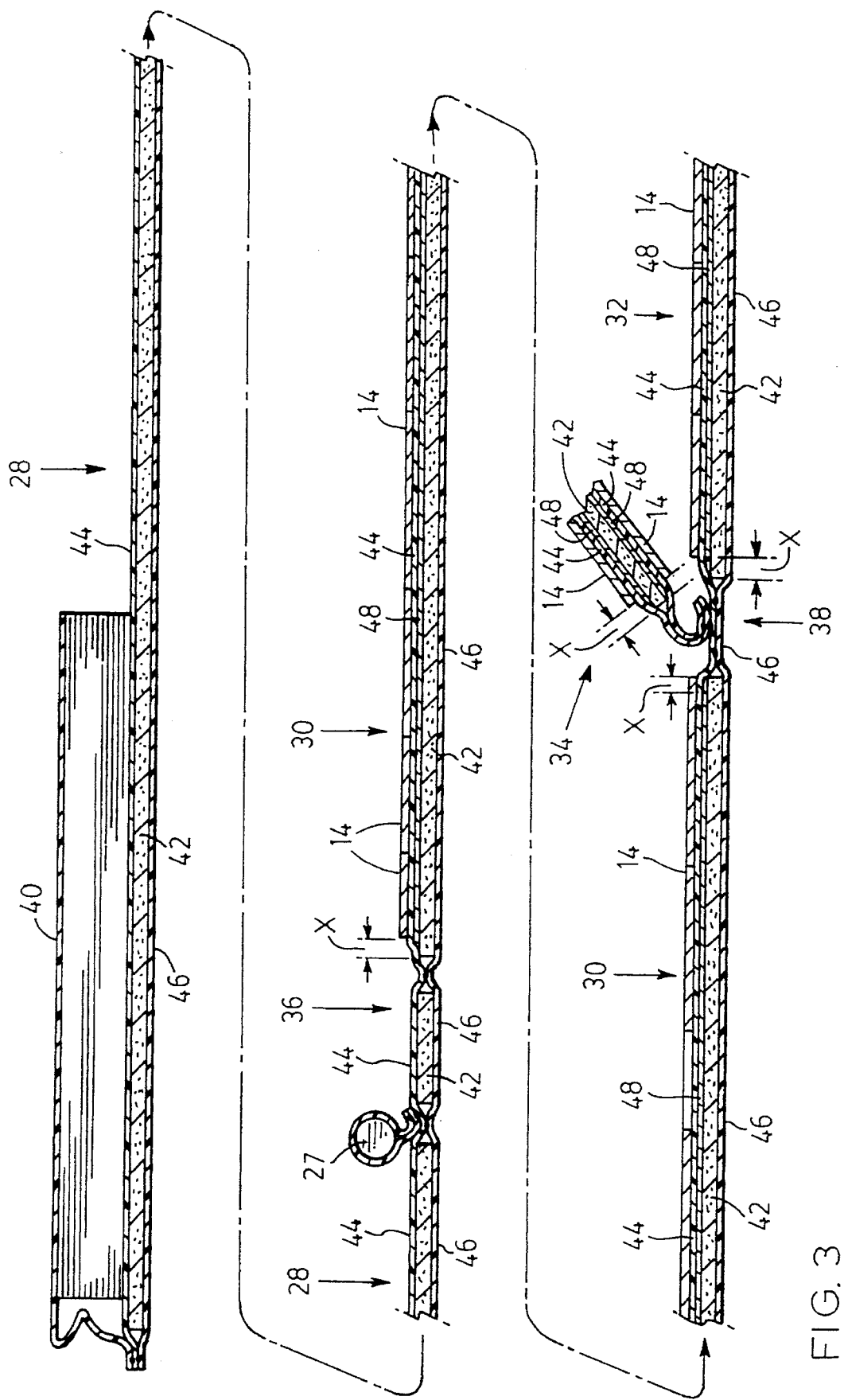
FIG. 3 is a transverse cross-section to a larger scale through the assembly of FIG. 1, taken on the line 3—3 therein, to show its structure.
Figures 4, 5, 8:
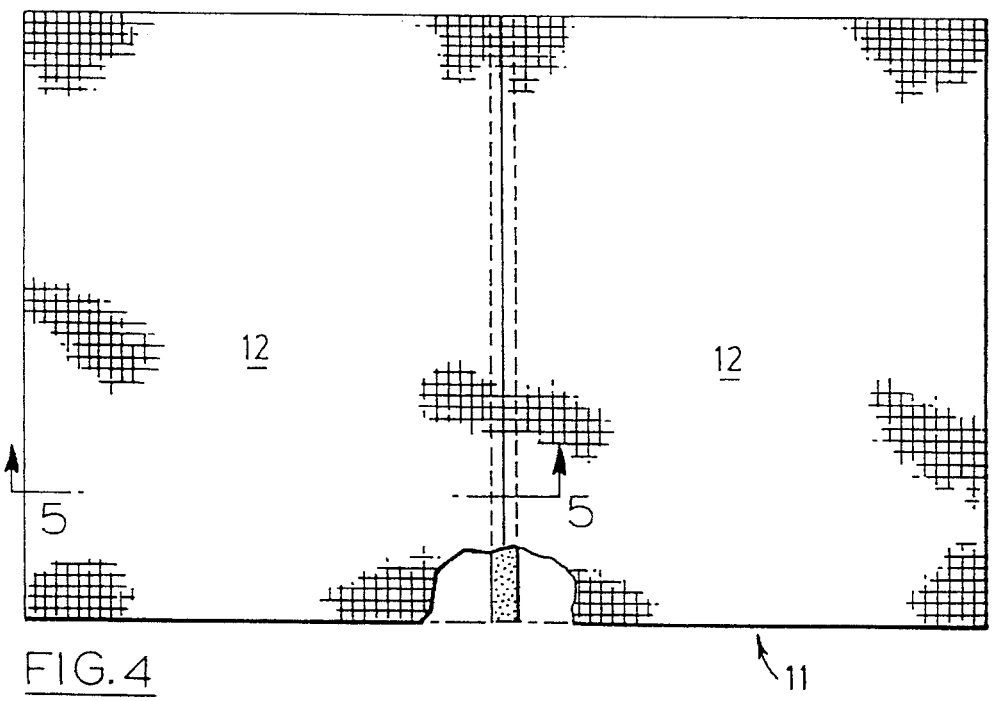
FIG. 4 is a plan view from above of the element receiving member as removed from the assembly and opened for use in planning an office furniture layout.
FIG. 5 is a transverse cross-section through the assembly of FIG. 4, taken on the line 5—5 therein, to show its structure.
FIG. 8 is a plan view to an enlarged scale of a special project information element usable with all embodiments.

The assembly has the form of a folder of convenient standard size when the leaves thereof are fully folded together, for example about 30.5 cm (12.2 ins) long and 26 cm (10.4 ins) wide; the thickness of a particular assembly folder will of course vary, depending upon the number of leaves it comprises. The assembly comprises a removable element receiving member 11, in commercial terms frequently referred to as a graph board or layout board, which for clarity of illustration is shown in outline only in FIGS. 1 and 2, is not shown in FIG. 3, and is shown in more detail in FIGS. 4 and 5, the member providing an element receiving surface 12, upon which planning elements 14A, 14B and 14C (decorative and/or information elements in the case of other embodiments) are placed and magnetically adhered thereto. Referring specifically to FIGS. 4 and 5, the member 11 comprises two equal-size leaves which are hinged together along their butting longer edges, so that they can be folded together, as illustrated, one on top of the other for storage, the leaves being opened to be coplanar for use. Each leaf comprises a support sheet 16 to the upper surface of which is secured, as by an adhesive or by double-sided adhesive tape, a thin sheet 18 of what is referred to herein as magnetizable metal, namely any metal or metal alloy that will cooperate with a permanent magnet of suitable strength to retain the magnet against movement thereon, even through an intervening thin sheet of non-magnetizable material. The support and metal sheets are sandwiched between a surface sheet 20 mounted over the metal sheet, and a closure sheet 22 covering the surface of the support sheet not having a metal sheet thereon, both of which are of a self-adhesive, non-magnetizable material, such as paper or a PVC coated on one side with a pressure-sensitive adhesive. In this embodiment the surface sheet 20 is folded over the edges of the support and metal sheets and has border portions extending partway over the back of the support sheet, while the closure sheet 22 overlies the said border portions to form a complete enclosure. The exposed surface 24 of each sheet 20 is provided with a printed representation facilitating the location of elements placed thereon, and in this embodiment, in that it is a planning assembly, this consists of a square grid pattern of suitable cell size. In the case, for example, of a toy assembly it would be an appropriate picture. A convenient scale is for example 1:48, so that the grid employs squares of side 6.25 mm (0.25 in), each of which is equivalent to a measurement of 30 cm (12 ins), so that when opened and flat the receiving member can be used to represent an area of 97.68 square meters (3,256 square feet). The surfaces 24 are in turn cowered with respective thin transparent layers 26 of a material that readily accepts an erasable ink, such as "MYLAR" (Trade Mark) of 1.5–3.0 mils thickness, so as to facilitate the drawing on the surfaces of a plan of the office requiring a planned furniture layout, and its ready amendment and removable when required. A pen 27 employing such an ink is provided as part of the assembly. Preferably the grid is printed in a light blue colour to which most copy machines are at best weakly sensitive, so that once a layout has been established it can be photocopied with the background grid reduced in contrast, or even completely eliminated. In an assembly intended for a dedicated area, such as a floor of a multi-story office building, the surface 24 may have the repetitive floor plan permanently printed thereon.

In this embodiment the folder has a single-sided pocket leaf 28, two single-sided element storage or holder leaves 30 and 32, and one double-sided storage or holder leaf 34, the two leaves 28 and 30 being hingedly connected to a spine portion 36 of sufficient width to accommodate the three leaves 30, 32 and 34 when folded together, while the three leaves 30 and 32 are hingedly mutually connected together at a thinner spine portion 38. The leaf 28 has a pocket-forming member 40 providing a gussetted pocket into which the folded member 11 is inserted for storage. All four leaves and the spine portion 36 have respective separate support sheets 42, while the three leaves 28, 30 and 32 and the spine portions 36 and 38 have their surface sheets 44 and cover sheets 46 formed from respective single continuous pieces of material. The double-sided leaf 34 has surface sheets 44 on both sides, and therefore does not require a cover sheet 46. The support sheets are, for example, sheets of stiff cardboard of thickness between 80 and 120 points, or sheets of so-called foam core board of about 3 mm (0.125 in) thickness, while the surface and cover sheets are of suitably coloured printable PVC, usually of about 14 gauge thickness. The surface sheets for the double-sided leaf 34 are of somewhat extra width to provide a narrow elongated flap serving as a hinge portion which is attached to the spine portion 38 by electrical heat (R.F.) welding together of the PVC layers.

The two leaves 30 and 32 have a thin magnetizable metal sheet 48 sandwiched between the respective support and surface sheets, while the leaf 34 has two such metal sheets, one on each side of the single support sheet, sandwiched between that sheet and the respective surface sheet. The exposed surfaces of the cover sheets of the leaf 28 and the spine portion 38 are usually printed with suitable identifying and promotional information, or more specifically identifying the furniture line for which the assembly is to be used. The exposed surfaces of the surface sheets 44 of the leaves 30, 32 and 34 are provided with respective depictions of the shapes, as seen in plan, of the elements 14 that are stored thereon. In this embodiment these depictions comprise outlines of the elements filled with solid colour, while the corresponding exposed outer faces of the elements placed thereon are of a contrasting solid colour, so that the presence and absence of any element on its respective depiction can readily be detected. As an example only FIG. 1 shows a block of elements 14 shaded to represent the colour green, while a corresponding block of depictions 14' are shaded to represent the colour brown.

Such a structure for the assembly, together with the use of R.F. electric welding to join together the PVC surface and cover sheets, and to provide the necessary hinge lines, reduces substantially the number of manufacturing steps and cost of the materials required and results in a relatively much less expensive product, sufficiently inexpensive that it becomes possible to consider presenting an assembly to a potential customer as a planning and promotional tool. A potential problem that has inhibited the use of R.F. electric welding in the presence of the highly electrically conductive metal sheets 18 and 48 has been solved simply and elegantly by arranging that each metal sheet is smaller in dimensions than those non-metallic sheets between which it is sandwiched by a margin around its entire periphery, indicated in FIG. 3 by the reference X. In this embodiment the value of X is at least 3 mm (0.125 in); such a margin has been found to be small enough not to reduce the element-carrying capacity of the sheets, but is large enough to permit such electric welding; a larger margin could be employed but reduces the area available for the accommodation of elements.

The nature and thickness of the material used for the support sheets 16 and 42 will depend upon commercial considerations. Suitable cardboard of the thickness range mentioned above is readily commercially available from its extensive use with ring binders and the like, and is relatively inexpensive, but the thicker layers that are preferred to obtain the desired stiffness, especially with thinner metal sheets, are also relatively heavy, and the metal sheets and the permanent magnet sheet material are already intrinsically somewhat heavy. A very thin layer of metal will easily provide the necessary magnetic adhesion, but consideration of cost dictates that the sheet must be of commercially available iron material that is produced in quantity for some other purpose. Commercial tinplate of thickness 0.375 mm (0.015 in) is readily available, but is thicker than is preferred in embodiments in which it is easy to combine it with a support layer, being sufficiently thick to be self-supporting for most purposes herein. Sheets of thickness 0.125 mm (0.005 in) are preferred from weight consideration, but are not sufficiently less expensive, and can be more expensive than tinplate, and moreover certainly require the use of a supporting layer.

All of the elements are of the permanent magnet sheet material described above, and it will be seen that a wide variety of shapes are provided, for example, worksurfaces of different shapes and sizes, file cabinets, seats, and tables. For ease of identification each element is provided on its outer surface with a visual representation, consisting of a graphic depiction of the furniture item which it represents, together with figures at its edges indicating its dimensions, and each such depiction has what for convenience is referred to herein as its respective visual orientation, so that the user is comfortable in placing the elements on the planning surface as the corresponding piece of furniture would be seen to be disposed in the office; the user is thus provided with an accurate picture of the resultant layout. The elements frequently are also provided with printed identifications, and are placed on the storage members in a visual orientation such that the printing can easily be read. In the drawings the individual support members are presented in portrait orientation, while the entire folder assembly is shown opened flat in landscape orientation. The visual orientation direction for the elements is indicated by the arrow 50.

The elements are stored as single layers on the storage members and adhere firmly without difficulty. However, when disposed on the element receiving planning member they are frequently required to be stacked one upon another. For example, it may be desired to consider what type of leg is best provided in combination with a particular size of desk or table top. There are at least six different types of leg generally available (i.e. Straight, X, Drum, ½ Moon, T and Pedestal), and this is best arranged by providing separate top and leg elements that can be stacked selectively on the desk or table top, since otherwise the number of separate combinations required becomes impractical. Again, it is frequently required to show the location of items such as hutch units, desk lamps, computer terminals, printers and typewriters on the desk and table surfaces, and this can only be done by stacking the corresponding elements. For reasons which are explained below, frequently this has been found to be impossible without the application of a particular aspect of this invention, and in its absence the usefulness of the assemblies is very restricted.

The problem arises from the magnetic structure of the readily commercially available sheet permanent magnet material. Thus, the sheet is magnetized in narrow parallel longitudinal strips of about 4 mm (0.16 in) width with the magnetic poles apparently orientated transversely at ninety degrees to the longitudinal direction. When two pieces of the same visual and magnetic orientations are placed with their inner surfaces together they adhere together strongly in a stable position. In the situation encountered when planning elements are stacked, they have the inner face of one against the outer face of the other, and they again adhere together in a stable position, but less strongly. In either case, if the two pieces are moved relative to one another transversely of the direction of the magnetic orientation, such movement will usually take place in steps of 4 mm width, from one stable relative position to the next. If the area of surface contact between the two elements is large, then the friction between them may be sufficient for them to remain stacked together in other than one of these stable positions, but this is usually not the case with small elements, such as legs and desk-top items, and attempts to place them in specific locations on a larger element are fruitless, in that when placed on that lower element in proper visual orientation they will move, apparently of their own accord, under the effect of their magnetic fields to one of the stable positions. With the typical scale used, as described above, this can involve a movement which in full scale represents about 19 cm (7.5 in), making effective planning difficult, and making the assembly extremely frustrating to use.

This problem is solved in accordance with an aspect of the invention by arranging that one plurality of the elements, for example that in which the elements will usually be the lowermost of a stack, have their visual and magnetic orientations in a first angular relation to one another, while another plurality of the elements that will usually be stacked on the first plurality elements, have their visual and magnetic orientations in another angular relation to one another. Thus, when elements of the two pluralities are placed on the support member with the same visual orientation, the magnetic orientations of the two pluralities are inclined to one another at an angle, and this angle is made large enough to permit an element of one plurality to be adhered to the support member while overlying an element of the other plurality also adhered to the support member, without interaction between their respective permanent magnet fields that would otherwise cause relative movement between them. The range of the possible angle between the two magnetic orientations is found to be quite wide, in the range 30–150 degrees, but for ease of production it is found most suitable to use an angle of either about forty five degrees, or about ninety degrees. It is usually not necessary to stack more than three elements on top of one another, but if a fourth element needed to be stacked, an angle of 135 degrees could be used, or a smaller angular difference employed between the four pluralities.

As a practical example for the elements referred to above, the elements of a first plurality representing desk and table tops will be printed on a sheet of the magnetic material and stamped therefrom with their visual and magnetic orientations parallel to one another, while the elements of a second plurality, representing the leg and table-top components, have their visual and magnetic orientations other than parallel to one another, usually at ninety degrees to one another. This aspect of the invention is extended by providing that a third plurality have their visual and magnetic orientations in an angular relation to one another different from that of the first two, for example at the angle of 45 degrees from each of the other two. Thus, when elements of all three pluralities are adhered to the support member with the same visual orientation the magnetic orientations are inclined to one another at angles that permit an element of any one of the pluralities to be adhered to the support member while overlying an element of either of the other two, without interaction between their respective permanent magnet fields that would otherwise cause undesired relative movement between them. This last-described arrangement is particularly useful, for example, when the third plurality elements represent items such as corner hutch units, which each comprise two body portions extending in the plane of the sheet at ninety degrees to one another, the elements being printed and stamped so that the magnetic orientation is inclined equally at about forty five degrees to the two body portions.

It is believed that it was most likely to permit element stacking that the prior art structure described above was adopted with magnetic sheet material used for the planning and storage members, while the individual elements included the cooperating magnetically attracted metal. With such a construction there is no need to consider the relation between the magnetic and visual orientations, but this freedom was only obtained by the adoption of a structure that is relatively difficult to manufacture and was therefore costly.

Figure 6:
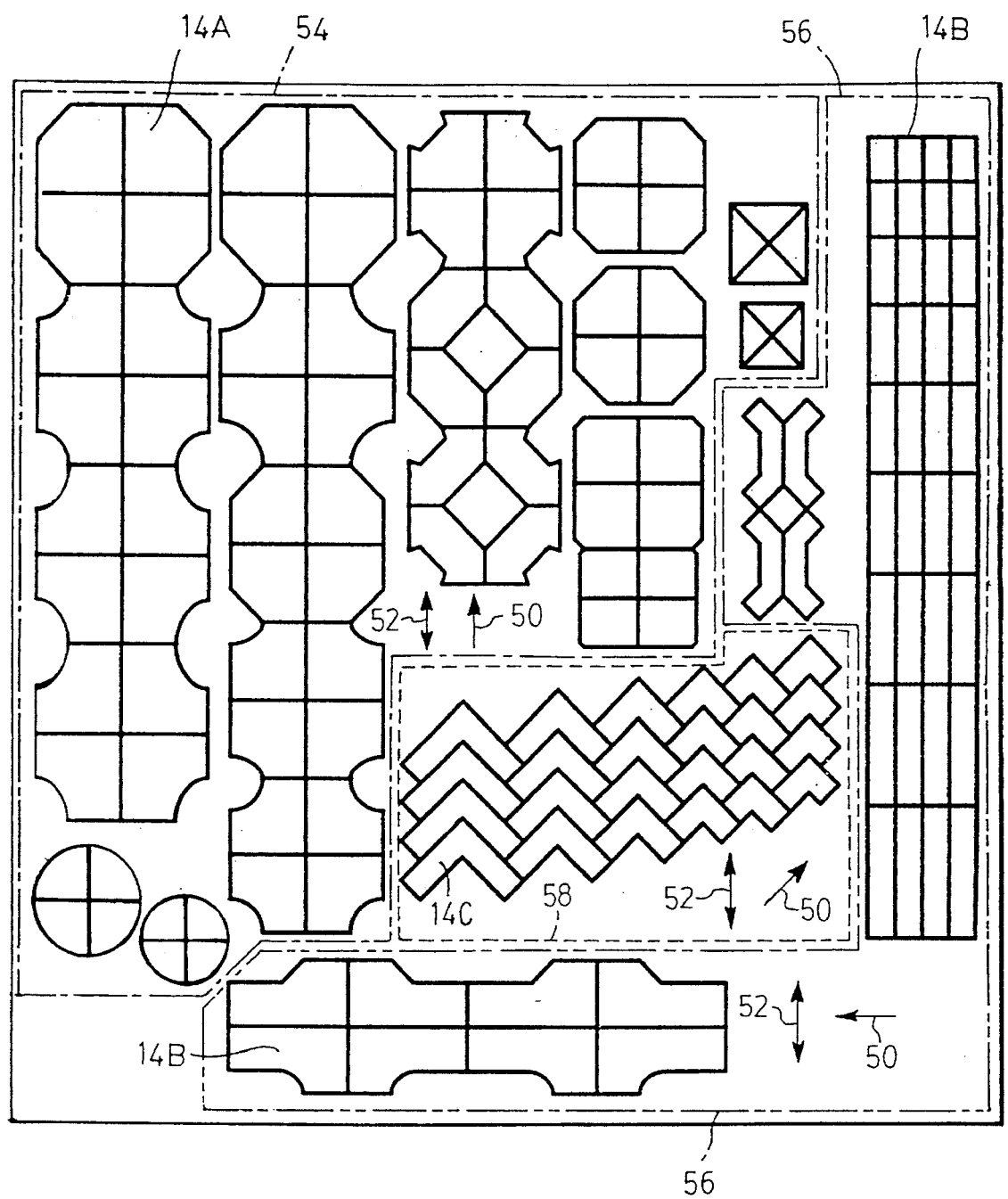
FIG. 6 is a plan view from above of a sheet of permanent magnet material as prepared to have elements stamped therefrom, the elements being arranged in pluralities thereof all with the same magnetic orientation, but having different relationships between their respective visual and magnetic orientations.
Figure 7:
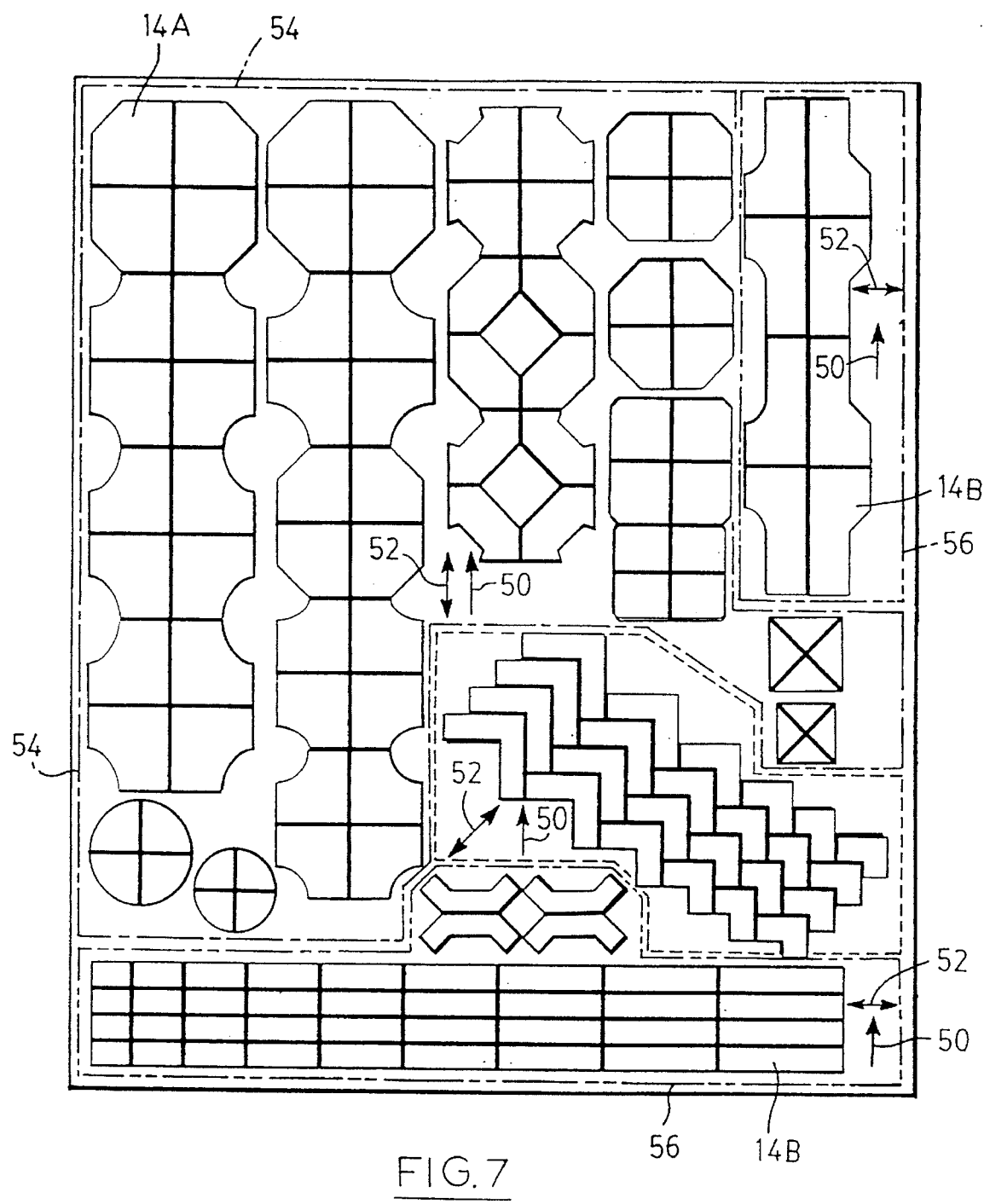
FIG. 7 is a plan view similar to FIG. 6 and showing how the elements of the sheet of FIG. 6 subsequently are arranged on a storage member with their visual orientations the same and with their magnetic orientations different.

The elements of the present invention are readily and relatively inexpensively produced by stamping, using simple steel rule dies, directly from the sheets of permanent magnet material, which may have the required pattern printed on a layer covering the outer surface, or which may have the pattern printed directly on the outer surface using a suitable ink. The material is available in various thicknesses, but that of thickness 0.8 mm (0.032 in) is preferred; the dies used are arranged to cut the elements completely from the sheets in groups, while the cuts between elements in a group extend about 85%–95% through the sheet, so that they stay together initially when placed on the stage members, but can easily be separated from one another when required. In large scale mass production each plurality of elements having the same relation between their magnetic and visual orientations could be cut from a respective sheet, but it is commercially more economical, especially for limited runs, to operate in accordance with another aspect of the invention, whereby each sheet provides all of the elements stored on a respective element storage sheet, even if comprises more than one of the said pluralities. To illustrate this, FIG. 6 shows the layout on a sheet of permanent magnet material of the elements to be cut therefrom in a single stamping operation, while FIG. 7 shows the manner in which those elements are mounted on the respective storage member with their visual orientations all parallel. In these figures the direction of visual orientation is indicated by the arrow 50, while the direction of magnetic orientation of the sheet material is indicated by the arrow 52. The plurality of elements 14A within the chain broken line 54 have their visual and magnetic orientations in a first angular relation, parallel in this embodiment, while a second plurality 145 enclosed in a double chain broken line 56 have their visual and magnetic orientations in another angular relation to one another, at ninety degrees in this embodiment. It will be seen from the comparison of the two figures that, when this second set of elements are placed on the storage member in position over the respective depiction, they have been rotated through ninety degrees, so that they present the same visual orientation, while the magnetic orientations are now inclined to one another at the ninety degree angle, which permits the elements to overly one another without interaction between their magnetic fields that could otherwise cause relative movement between them. The remaining elements 14C on the sheet enclosed in the broken line 58, which represent right angled corner hutch units, each with two portions extending at right angles, are stamped out with their preferred visual orientation at 45 degrees to the direction of magnetic orientation, and are then rotated through 45 degrees to locate them on the support sheet with their visual orientation parallel to the direction of the arrow 50.

A special element 60 shown in FIG. 8 is provided with each assembly comprising a project information label. This is attached to the support member ill in any convenient location clear of the mounted planning elements, and provides a convenient means for recording pertinent information which can subsequently be photocopied into a permanent record of the plan.

Figure 9:
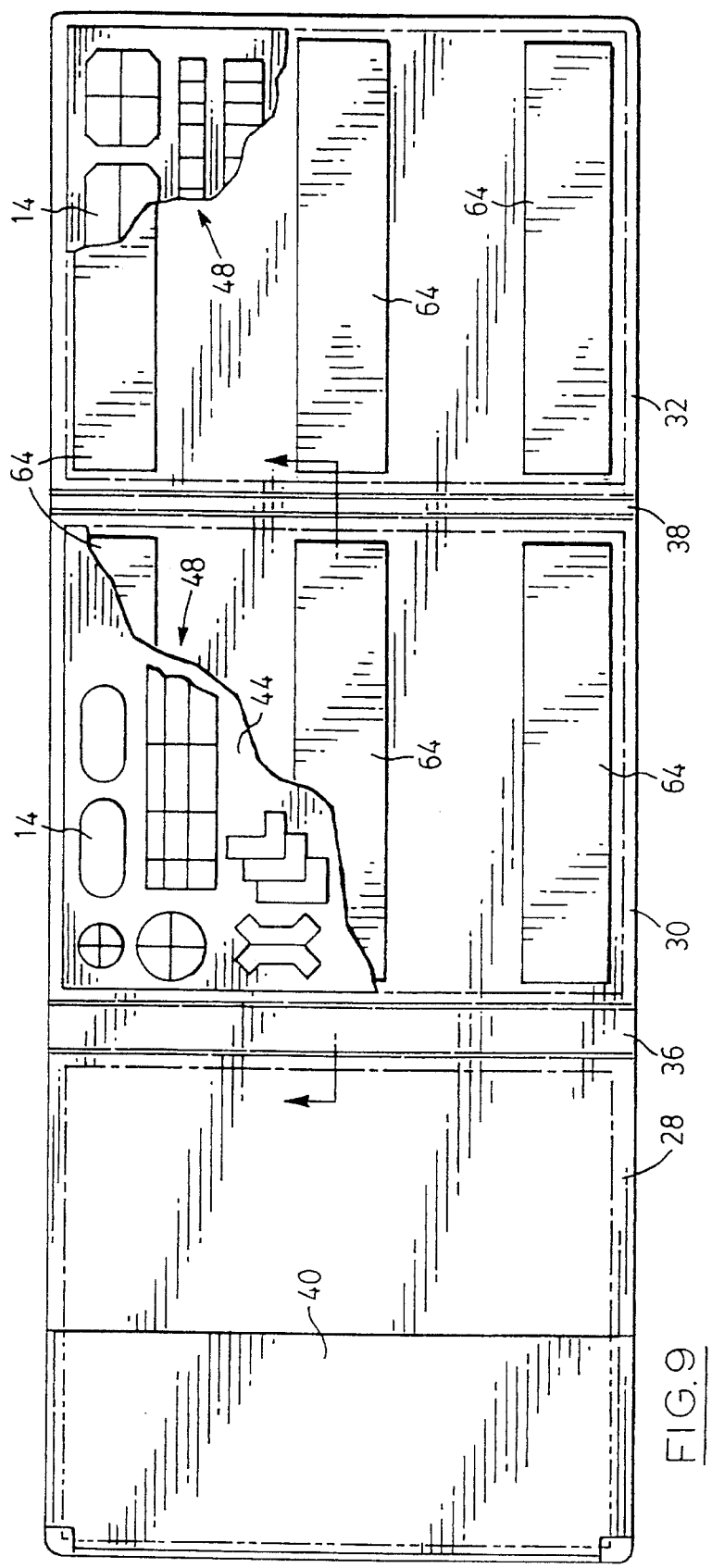
FIG. 9 is a plan view from above of an assembly that is a second embodiment comprising a folder including an element receiving member and two element storage members, wherein the element storage members are removable and replaceable.
Figure 10:
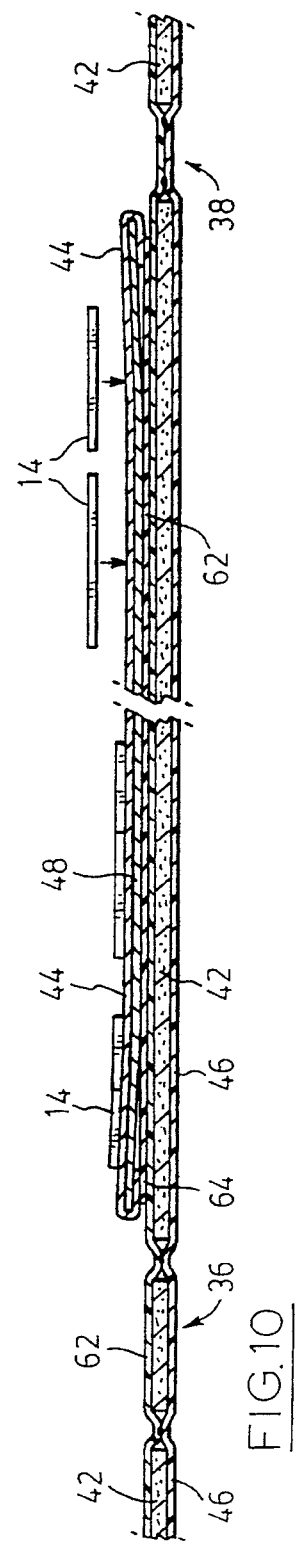
FIG. 10 is a transverse cross-section through the assembly of FIG. 9, taken on the line 10—10 therein, to show its structure.

FIGS. 9 and 10 illustrate an embodiment particularly intended for applications, such as kitchen or bathroom planning, and/or planning involving a limited furniture range, and/or for short run applications. The folder comprises three leaves, one of which is the pocket carrying leaf 28, and only two element storage leaves 30 and 32 are provided. Whereas in the embodiment of FIGS. 1 and 2 the support sheets 42 were sandwiched between the surface and cover sheets 44 and 46, in this embodiment the two element storage members do not require them, and instead they are sandwiched between the cover sheet 46 and an additional sheet 62, the two sheets 46 and 62 being of R.F. sealed PVC, as with a conventional ring binder. Each element storage member comprises only the metal sheet 48 with the respective printed surface sheet 44 adhered thereto, as by a pressure sensitive adhesive, the metal sheet being thick enough to be self supporting. Alternatively a thinner metal sheet can be mounted on a support layer, but the thicker metal sheet material is available as commercial tinplate, and the thinner material is not necessarily sufficiently cheaper in view of the added manufacturing step involved in providing it with a supporting layer. Each support leaf is removably adhered to its respective leaf of the folder by means of an intervening layer 64, which can be an entire sheet, or suitably spaced pieces, of permanent magnet material adhesively fastened to the additional sheet 62, or which can be strips of double-sided adhesive tape. Such a structure allows essentially the same folder structure to be used for different assemblies, while customised relatively small numbers of element storage members using this structure can be provided economically.

| List of Reference Numbers | |
|---|---|
| X | Distance between support and metal sheet edges |
| 11 | Element receiving member |
| 12 | Element receiving surface of member 11 |
| 14 | General reference number for planning elements |
| 14A | First plurality of planning elements in FIGS. 7 and 8 |
| 14B | Second plurality of planning elements in FIGS. 7 and 8 |
| 14C | Third plurality of planning elements in FIGS. 7 and 8 |
| 14' | Coloured depiction of elements 14 |
| 16 | Support sheet for member 11 |
| 18 | Metal sheet for member 11 |
| 20 | Surface sheet for member 11 |
| 22 | Closure sheet for member 11 |
| 26 | Transparent ink-receiving layer on sheet 20 |
| 27 | Pen |
| 28 | Leaf with pocket for storage of member 11 |
| 30 | Single-sided element support leaf |
| 32 | Single-sided element support leaf |
| 34 | Double-sided element support leaf |
| 36 | Spine portion between leaves 28 and 30 |
| 38 | Spine portion between leaves 30, 32 and 34 |
| 40 | Pocket-forming member on leaf 28 |
| 42 | Leaf and spine support sheets |
| 44 | Leaf and spine surface sheets |
| 46 | Leaf and spine cover sheets |
| 48 | Metal sheets for leaves 30, 32 and 34 |
| 50 | Arrows indicating direction of visual orientation |
| 52 | Arrows indicating direction of magnetic orientation |
| 54 | Single dotted chain line enclosing elements 14A |
| 56 | Double dotted chain line enclosing elements 14B |
| 58 | Broken line enclosing elements 14C |
| 60 | Special project information sheet element |
| 62 | Additional sheet in second embodiment |
| 64 | Intervening layer in second embodiment |

I claim:

1. An assembly comprising:

an element receiving member providing an element receiving surface;

an element storage member for the storage of a plurality of elements also providing an element receiving surface; and a plurality of elements adherable by permanent magnetic attraction to the element receiving surfaces of the receiving and storage members;

wherein the assembly also comprises a pocket member removably receiving the element receiving member, the pocket member being hingedly connected to the element storage member to permit them to be folded one on the other and constitute a folder for the assembly;

wherein the element receiving member comprises;

a thin sheet of magnetizable metal;

and a surface sheet mounted over the metal sheet and having on the exposed surface thereof a representation facilitating the location of elements placed thereon;

wherein the element storage member comprises;

a thin sheet of magnetizable metal;

and a respective surface sheet mounted over the metal sheet and having on the exposed surface thereof representations of elements to be stored thereon; and wherein each element comprises a portion of a permanently magnetized sheet material operable as a permanent magnet of sufficient strength to adhere to the exposed surfaces of the receiving and storage member surface sheets.

2. An assembly as claimed in claim 1, wherein the element receiving member comprises two portions hingedly connected to one another along adjacent edges thereof to permit them to be folded one on the other, the portions when unfolded and in the same plane butting at the adjacent edges to provide a continuous element receiving surface.

3. An assembly as claimed in claim 1, and comprising a second element storage member hingedly attached to the first-mentioned element storage member to permit the first and second element storage and the element receiving member to be folded one on the other to constitute the assembly folder.

4. An assembly as claimed in claim 3, and comprising a third element storage member hingedly attached to the junction of the first and second element storage members so as to be interposed between them when they are folded one on the other;

the third storage member comprising:

a central support sheet;

two thin sheets of magnetizable metal, each mounted on a respective surface of the central support sheet; and two surface sheets, each mounted over the respective metal sheet and having on the exposed surfaces thereof representations of elements to be stored thereon.

5. An assembly as claimed in claim 3, wherein the surface sheet for the pocket member and the surface sheets for the first and second element storage members are continuous over the three members.

6. An assembly as claimed in claim 3, wherein the pocket and the first and second element storage members each comprise a closure sheet covering the surface of the metal sheet not covered by the surface sheet, and the closure sheets for the members are continuous over the three members.

7. An assembly as claimed in claim 1, wherein each thin sheet of magnetizable material is mounted on a respective support sheet of lower weight per unit area than the metal to reduce the total weight of the respective member.

8. An assembly as claimed in claim 1, wherein the exposed surface of the element receiving member is covered with a layer of a non-porous material for receipt of an erasable ink.

9. An assembly as claimed in claim 1, wherein the representation on the exposed surface of the element receiving member is of light blue colour so that its reproduction by a copy machine can be controlled and prevented.

10. An assembly as claimed in claim 1, wherein the element representations on the exposed surface of the element storage member surface sheet are of one colour and the outer surfaces of the elements that are to be placed on those representations are of a contrasting colour, so that the presence and absence of a specific element on its respective representation can readily be detected.

11. An assembly as claimed in claim 1, wherein the pocket and storage members each comprise a closure sheet covering the surface of the metal sheet not covered by the surface sheet, wherein each pair of associated closure and support sheets is of electrically weldable material, and wherein the respective metal sheet sandwiched between them is smaller in length and width than those sheets by a margin around its entire periphery of at least 3 mm (0.125 in) to permit such electric welding.

12. An assembly as claimed in claim 1, wherein each element storage member comprises a support sheet, and wherein at least the thin sheet of magnetizable material and the surface sheet thereof are removably attached to the support sheet.

13. An assembly as claimed in claim 1, and comprising a project information receiving element of sheet magnetic material adherable magnetically to the element receiving member.

14. An assembly as claimed in claim 1, wherein each element exhibits a visual representation having a respective visual orientation and the permanent magnetic sheet material thereof has a respective magnetic orientation;

wherein one plurality of the elements have their visual and magnetic orientations in a first angular relation to one another; and wherein another plurality of the elements have their orientations in another angular relation to one another whereby, when elements of the two pluralities are adhered with the same visual orientation to an element receiving member, the magnetic orientations of the two pluralities are inclined to one another at an angle permitting an element of one plurality to be adhered to the element receiving member while overlying an element of the other plurality adhered to the element receiving member, without interaction between their respective permanent magnet fields that would otherwise cause relative movement between the overlying elements.

15. An assembly as claimed in claim 14, wherein the angle between the magnetic orientations of the two pluralities is about forty five degrees.

16. An assembly as claimed in claim 14, wherein the angle between the magnetic orientations of the two pluralities is about ninety degrees.

17. An assembly as claimed in claim 14, wherein a further plurality of the elements have their visual and magnetic orientations in an angular relation to one another different from that of the said one and another pluralities whereby, when elements of all three pluralities are adhered with the same visual orientation to the element receiving member, the magnetic orientations of the pluralities are inclined to one another at angles permitting an element of one plurality to be adhered to the element receiving member while overlying an element of either of the other two pluralities adhered to the element receiving member, without interaction between their respective permanent magnet fields that would otherwise cause relative movement between the overlying elements.

18. An assembly as claimed in claim 17, wherein the angle between the magnetic orientations of two of the pluralities is about ninety degrees, and the angle between the magnetic orientations of the first-mentioned two pluralities and the third plurality is about forty five degrees.

19. An assembly as claimed in claim 14, wherein certain of the elements each comprise two body portions extending in the plane of the sheet at ninety degrees to one another and the magnetic orientation of the magnetized sheet material is inclined equiangularly at about forty five degrees to the two body portions.

20. An assembly as claimed in claim 1, wherein the surface sheet for the pocket member and the surface sheet for the element storage member are continuous over the two members.

21. An assembly as claimed in claim 1, wherein the pocket and element storage members each comprise a closure sheet covering the surface of the metal sheet not covered by the surface sheet, and the closure sheets for the members are continuous over the two members.

22. An assembly of elements of permanent magnet sheet material, wherein each element exhibits a visual representation having a respective visual orientation and the permanent magnetic sheet material thereof has a respective magnetic orientation;

wherein one plurality of the elements have their visual and magnetic orientations in a first angular relation to one another;

wherein another plurality of the elements have their visual and magnetic orientations in another angular relation to one another whereby, when elements of the two pluralities are adhered with the same visual orientation to an element receiving member comprising a sheet of magnetizable metal, the magnetic orientations of the two pluralities are inclined to one another at an angle permitting an element of one plurality to be adhered to the element receiving member while overlying an element of the other plurality adhered to the element receiving member, without interaction between their respective permanent magnetisms that would otherwise cause relative movement between the overlying elements;

and wherein the two pluralities of elements with different angular relations are formed by stamping from a single sheet of permanent magnet sheet material.

23. An assembly as claimed in claim 22, wherein the angle between the magnetic orientations of the two pluralities of elements is about forty five degrees.

24. An assembly as claimed in claim 22, wherein the angle between the magnetic orientations of the two pluralities of elements is about ninety degrees.

25. An assembly as claimed in claim 22, wherein a further plurality of the elements have their visual and magnetic orientations in an angular relation to one another different from that of the said one and another pluralities whereby, when elements of all three pluralities are adhered with the same visual orientation to the element receiving member, the magnetic orientations of the pluralities are inclined to one another at angles permitting an element of one plurality to be adhered to the support member while overlying an element of either of the other two pluralities adhered to the support member, without interaction between their respective permanent magnetisms that would otherwise cause relative movement between the overlying elements;

and wherein the three pluralities of elements with different angular relations are formed by stamping from a single sheet of permanent magnet sheet material.

26. An assembly as claimed in claim 25, wherein the angle between the magnetic orientations of two of the pluralities of elements is about ninety degrees, and the angle between the magnetic orientations of the first-mentioned two pluralities and the third plurality is about forty five degrees.

27. An assembly as claimed in claim 22, wherein certain of the elements each comprise two body portions extending in the plane of the sheet at ninety degrees to one another and the magnetic orientation of the sheet is inclined equiangularly at about forty five degrees to the two body portions.

* * * * *